(12) United States Patent
Turner et al.

(10) Patent No.: US 8,197,167 B2
(45) Date of Patent: *Jun. 12, 2012

(54) SECURING MECHANISMS FOR COMPONENTS OF A LOAD INDICATING FASTENER

(75) Inventors: F. Jonathan M. Turner, Philadelphia, PA (US); Nicholas Strumbos, Birmingham, MI (US); Robert Stewart, Farmington Hills, MI (US)

(73) Assignee: TurnAnut LLC, Livonia, MI (US)

( * ) Notice: Subject to any disclaimer, the term of this patent is extended or adjusted under 35 U.S.C. 154(b) by 567 days.

This patent is subject to a terminal disclaimer.

(21) Appl. No.: 12/252,196

(22) Filed: Oct. 15, 2008

(65) Prior Publication Data

US 2009/0047060 A1 Feb. 19, 2009

Related U.S. Application Data

(63) Continuation-in-part of application No. 11/501,993, filed on Aug. 10, 2006, now Pat. No. 7,635,243.

(51) Int. Cl.
*F16B 31/02* (2006.01)
(52) U.S. Cl. .......................... 411/10; 411/533
(58) Field of Classification Search ............ 411/14, 411/8–10, 533
See application file for complete search history.

(56) References Cited

U.S. PATENT DOCUMENTS

| | | | |
|---|---|---|---|
| 2,520,259 A | 4/1950 | Pummill | |
| 2,679,880 A * | 6/1954 | Poupitch | 411/134 |
| 3,187,621 A | 6/1965 | Turner | |
| 3,386,771 A * | 6/1968 | Verdier | 301/35.625 |
| 4,362,449 A * | 12/1982 | Hlinsky | 411/156 |
| 4,431,353 A | 2/1984 | Capuano | |
| 4,900,209 A | 2/1990 | Reynolds | |
| 5,015,132 A | 5/1991 | Turner et al. | |
| 5,049,017 A * | 9/1991 | Reynolds | 411/432 |
| 5,256,020 A | 10/1993 | Ikeda et al. | |
| 5,370,483 A | 12/1994 | Hood et al. | |
| 5,487,632 A | 1/1996 | Hood et al. | |
| 5,597,279 A | 1/1997 | Thomas et al. | |
| 5,626,449 A * | 5/1997 | McKinlay | 411/149 |
| 5,667,346 A | 9/1997 | Sharp | |
| 5,668,346 A | 9/1997 | Kunz et al. | |

(Continued)

OTHER PUBLICATIONS

REMINC Brochure, TAPTITE II and Other TRILOBULAR Products for Fastening Metals and Plastics, Copyright 2001, Research Engineering & Manufacturing Inc.

*Primary Examiner* — Flemming Saether
(74) *Attorney, Agent, or Firm* — Stradley Ronon Stevens & Young, LLP

(57) ABSTRACT

A load indicating fastener comprising a load indicator, a fastener body, and a securing mechanism retaining the load indicator on the fastener body. The load indicator has integral protuberances struck and partially sheared from the load indicator to project from a face and leave corresponding indentations in an opposite face. The securing mechanism may be a member extending radially outward from the shank of the fastener body, such as a plurality of spaced apart tabs; at least one thread; at least one flare, stake, or form; a step ring; a series of bumps; a knurl; and one or more lobes. Alternative embodiments of the securing mechanism include a key-and-keyhole combination; an interference fit facilitated by a chamfer or by one or more lobes or by shaped surfaces of the fastener body and of the load indicator; one or more tack welded interconnections; and an adhesive patch.

22 Claims, 14 Drawing Sheets

U.S. PATENT DOCUMENTS

| | | |
|---|---|---|
| 5,769,581 A | 6/1998 | Wallace et al. |
| 5,827,025 A | 10/1998 | Henriksen |
| 5,908,278 A | 6/1999 | Hasan et al. |
| 5,931,618 A | 8/1999 | Wallace et al. |
| 5,975,821 A | 11/1999 | Kue |
| 6,070,946 A | 6/2000 | Holmes |
| 6,517,301 B2 * | 2/2003 | Hartmann et al. ............ 411/136 |
| 7,635,243 B2 * | 12/2009 | Turner et al. .................... 411/10 |

* cited by examiner

SECURING MECHANISMS FOR COMPONENTS OF A LOAD INDICATING FASTENER

RELATED APPLICATION

The present application is a continuation-in-part of U.S. patent application Ser. No. 11/501,993 titled "Load Indicating Fastener and Method of Manufacture," filed on Aug. 10, 2006 on behalf of the inventors F. Jonathan M. Turner, Nicholas Strumbos, and Robert Stewart, and issued as U.S. Pat. No. 7,635,243, the contents of which are incorporated in this document by reference.

TECHNICAL FIELD

The present invention relates, in general, to fasteners and, in particular, to load indicators which enable the desired tension of a fastener to be achieved during installation of the fastener in a joint.

BACKGROUND OF THE INVENTION

It is well known to those skilled in the art that the most accurate way to install tension into fasteners in a joint is to control tightening by developing an indication of the tension in the fastener either directly from the fastener or from another component used with the fastener. Fastener installation based on torque control can result in wide variations in the tension in the fastener because of variations in fastener lubricity, burrs on the thread of threaded fasteners, and variations in the friction at the surface of the joint component against which the bearing surface of a threaded fastener bears.

U.S. Pat. No. 3,187,621, which is incorporated herein by reference, is directed to a load indicator adapted for use with a threaded fastener and intended to develop an indication of proper tensioning of the fastener. This load indicator has a plurality of protuberances which are struck and partially sheared from an annular body to leave indentations in the annular body. With this load indicator in a joint, the protuberances are pushed back into the indentations in the annular body as the joint is tightened and tightening is stopped when the protuberances have been "collapsed" back into the indentations in the annular body a prescribed amount. This condition, typically, is sensed by a "feeler" gage inserted into a gap in the joint. U.S. Pat. No. 5,015,132, U.S. Pat. No. 5,370,483, U.S. Pat. No. 5,487,632, and U.S. Pat. No. 5,667,346, each of which is incorporated herein by reference, also are directed to this type of load indicator.

BRIEF SUMMARY OF THE INVENTION

In one aspect, the present invention relates to a load indicating fastener comprising a load indicator and a fastener body. The load indicator comprises an annular body defining a through hole having a minimum diameter. The load indicator further comprises a plurality of protuberances integral with the annular body struck and partially sheared from the annular body to project from a first face of the annular body and leave a corresponding plurality of indentations in a second face of the annular body opposite from the first face. The fastener body may comprise a series of threads, a head defining a contact surface, and a shank depending from the contact surface. The shank includes a first portion having a first outside diameter less than the through hole minimum diameter such that the load indicator is received on the shank first portion with the protuberances proximate to and in alignment with the head contact surface. The shank may further include a second portion including at least one radially extending member having a second outside diameter greater than the through hole minimum diameter such that the load indicator is retained on the fastener body thereby.

In at least one aspect of the invention, the load indicating fastener is a nut wherein the fastener body defines a through bore extending through the head and the shank and the series of threads are provided along an inside surface of the through bore.

In another aspect of the invention, the load indicating fastener is a bolt or screw wherein the series of threads are provided along an outside surface of the shank second portion. In such an aspect of the invention, one of the threads may define the at least one radially extending member.

In yet another aspect, the invention relates to a load indicator comprising an annular body defining a through hole having a minimum diameter. A plurality of protuberances are formed integral with the annular body, struck and partially sheared from the annular body to project from a first face of the annular body and leave a corresponding plurality of indentations in a second face of the annular body opposite from the first face. An annular groove having a diameter greater than the second outside diameter (of the at least one radially extending member of the shank of the fastener body) is defined in the annular body second face about the through hole.

In another aspect, the invention relates to a joint assembly comprising at least one joint member, a load indicating fastener, and a secondary fastener. The load indicating fastener includes a load indicator and a fastener body. The load indicator comprises an annular body defining a through hole having a minimum diameter. The load indicator further comprises a plurality of protuberances integral with the annular body struck and partially sheared from the annular body to project from a first face of the annular body and leave a corresponding plurality of indentations in a second face of the annular body opposite from the first face. The fastener body may comprise a first series of threads, a first head defining a contact surface, and a first shank depending from the contact surface. The first shank includes a first portion having a first outside diameter less than the through hole minimum diameter such that the load indicator is received on the shank first portion with the protuberances proximate to and in alignment with the head contact surface. The first shank further includes a second portion including at least one radially extending member having a second outside diameter greater than the through hole minimum diameter such that the load indicator is retained on the fastener body thereby. The secondary fastener comprises a second fastener body and may comprise a second series of threads. The first shank or a portion of the second fastener body is extended through the at least one joint member and the first series of threads is rotatably and threadably engaged with the second series of threads until the first head contact surface is spaced a given distance from the annular body first face.

In yet another aspect, the present invention relates to a load indicating fastener comprising a fastener body and a load indicator having an annular body positioned about and captured by a portion of the fastener body. The load indicator has a plurality of protuberances integral with the annular body struck and partially sheared from the annular body to project from a first face of the annular body and leave a corresponding plurality of indentations in a second face of the annular body opposite from the first face.

In another aspect, the present invention relates to a load indicating fastener comprising a load indicator and a fastener body. The load indicator comprises an annular body defining a through hole having a minimum diameter. The load indicator further comprises a plurality of protuberances integral with the annular body struck and partially sheared from the annular body to project from a first face of the annular body and leave a corresponding plurality of indentations in a second face of the annular body opposite from the first face. An annular groove having a diameter is defined in the second face about the through hole to define a detainment shoulder within the annular body. The fastener body may comprise a series of threads, a head defining a contact surface, and a shank depending from the contact surface. The shank includes a first portion having a first outside diameter less than the through hole minimum diameter such that the load indicator is received on the shank first portion with the protuberances proximate to and in alignment with the head contact surface. The shank further includes a second portion including at least one radially extending member having a second outside diameter greater than the through hole minimum diameter such that the at least one radially extending member is received in the annular groove and engages the retainment shoulder to capture the load indicator on the fastener body. The diameter of the annular groove is greater than the second outside diameter of the at least one radially extending member of the shank of the fastener body.

In still yet another aspect, the present invention relates to a method of producing a load indicating fastener comprising: providing a fastener body having a first series of threads, a head defining a contact surface, and a shank depending from the contact surface; positioning a load indicator, having an annular body defining a through hole with a minimum diameter and a plurality of protuberances integral with the annular body struck and partially sheared from the annular body to project from a first face of the annular body and leave a corresponding plurality of indentations in a second face of the annular body opposite from the first face, about the shank such that the protuberances are proximate to and in alignment with the head contact surface; and defining at least one radially extending member having an outside diameter greater than the through hole minimum diameter about the shank such that the load indicator is retained on the fastener body thereby.

In a further aspect of the present invention, a load indicating fastener is provided that includes a load indicator, a fastener body, and a securing mechanism. The load indicator includes an annular body having an inner surface defining a through hole with an inner diameter, and a plurality of protuberances integral with the annular body struck and partially sheared from the annular body to project from a first face of the annular body and leave a corresponding plurality of indentations in a second face of the annular body opposite from the first face. The fastener body includes a head defining a contact surface, and a shank depending from the contact surface at its top and having a free end opposite the top and an outside surface with an outer diameter. The securing mechanism retains the load indicator on the shank of the fastener body with the protuberances proximate to and in alignment with the contact surface.

A variety of securing mechanisms are provided, as described in detail below. In summary, the securing mechanism may be a member extending radially outward from the shank of the fastener body, such as a plurality of spaced apart tabs; at least one thread; at least one flare, stake, or form; a step ring; a series of bumps; a knurl; and one or more lobes. Alternative embodiments of the securing mechanism include a key-and-keyhole combination; an interference fit facilitated by a chamfer or by one or more lobes or by shaped surfaces of the fastener body and of the load indicator; one or more tack welded interconnections; and an adhesive patch.

BRIEF DESCRIPTION OF THE DRAWING

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included in the drawing are the following figures.

DETAILED DESCRIPTION OF THE INVENTION

Figure 1:
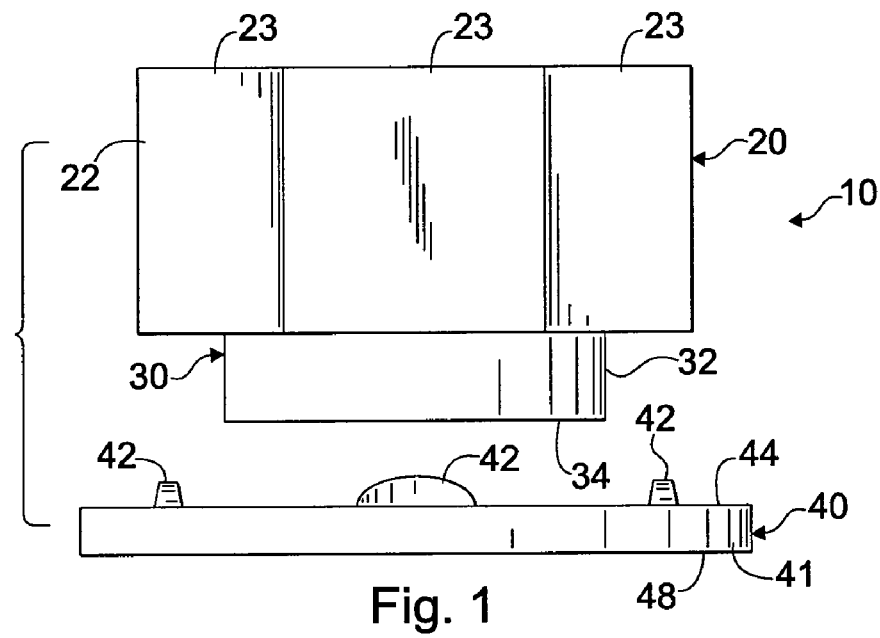
FIG. 1 is a side elevation view of a load indicating fastener in accordance with a first embodiment of the invention before assembly of the load indicator with the fastener body.

Referring now to the drawing, in which like reference numbers refer to like elements throughout the various figures that comprise the drawing, FIGS. 1-5 illustrate an exemplary embodiment of a load indicating fastener 10. Load indicating fastener 10 may alternatively be referred to as an engineered clamp load assurance assembly. Load indicating fastener 10 generally comprises a fastener body 20 and a load indicator 40. In this exemplary embodiment, fastener body 20 is a threaded nut which generally includes a head 22 having a contact surface 24 with a shank 30 depending from head 22. A through bore 26 extends through head 22 and shank 30 and includes a series of internal threads 28. Threads 28 may extend within both head 22 and shank 30, as illustrated, only within head 22, or in any other desired configuration.

The illustrated head 22 has a hexagon configuration with six engagement faces 23 (only three are shown). Other configurations may be used, however, in designing head 22. For example, but without limitation, head 22 may be square, straight hex, spanner, or hex flange (see FIG. 6). Fastener body 20 may be made to correspond with any desired standard, for example, metric, SAE, ASTM, or British standard. Furthermore, head 22 and threads 28 may include locking features or friction modifiers. For example, head 22 may include a reduced diameter or split portion (not shown), or threads 28 may include a nylon insert (not shown) or the like, to provide a locking feature. A friction-modifying insert or coating (not shown) or the like may be provided along threads 28 to modify the friction characteristics of load indicating fastener 10. Various other modifications may be made to fastener body 20 without departing from the scope of the invention.

Figure 2:
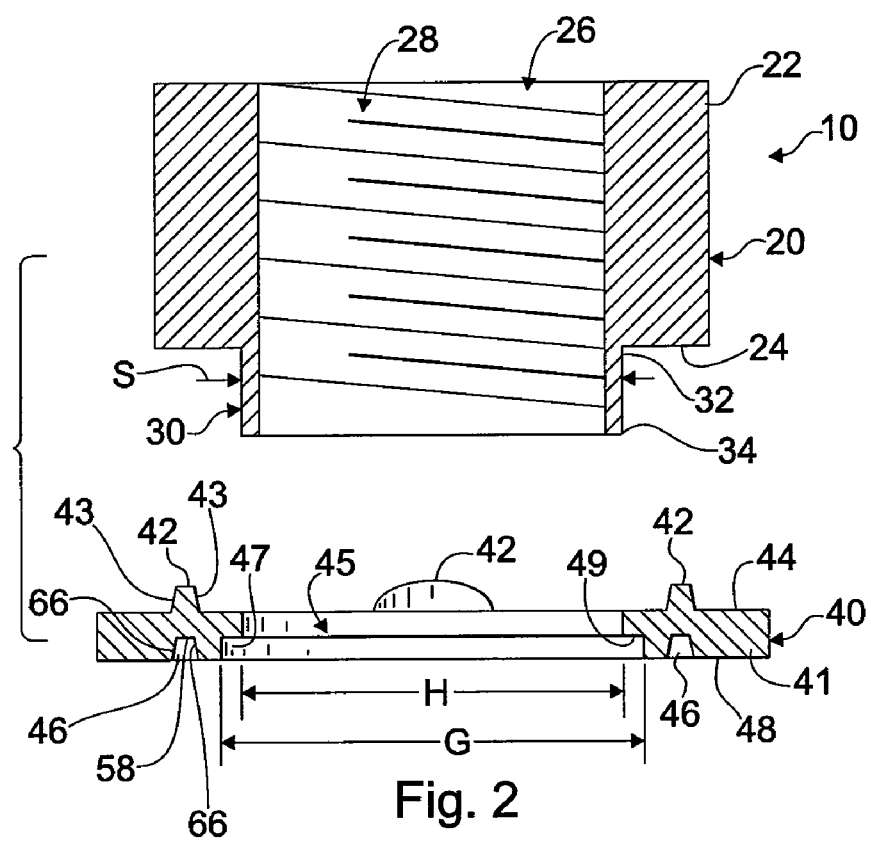
FIG. 2 is a cross-sectional view of the load indicating fastener of FIG. 1 before assembly.
Figure 3:
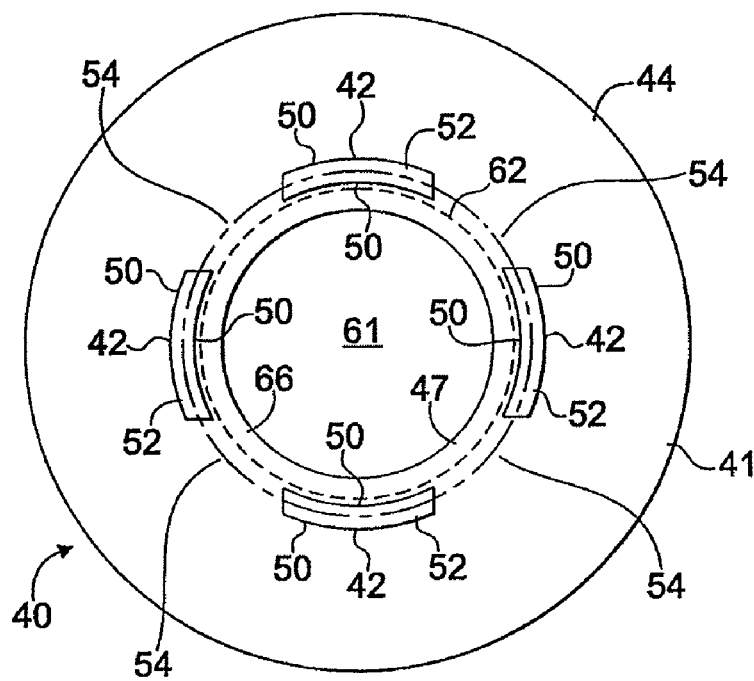
FIG. 3 is a plan view of one face of an illustrative load indicator constructed in accordance with at least one embodiment of the present invention.

Referring to FIG. 3, load indicator 40 in accordance with the present embodiment of the invention includes an annular body 41 and a plurality of protuberances 42 integral with annular body 41 struck and partially sheared from annular body 41 to project from a first face 44 of annular body 41 and leave a corresponding plurality of indentations 46, see FIG. 2, in a second face 48 of annular body 41 opposite from first face 44. (By "integral" is meant a single piece or a single unitary part that is complete by itself without additional pieces, i.e., the part is of one monolithic piece formed as a unit with another part.) Each protuberance 42 is defined by a pair of outer side walls 50 extending away from first face 44 of annular body 41 and by an outer surface 52 extending between the pair of outer side walls 50 and between two spaced regions 54 of first face 44 of annular body 41. Each indentation 46 is defined by a pair of inner side walls 66 extending through annular body 41 from second face 48 and from which a pair of outer side walls 43 of one of the protuberances 42 has been sheared and inner surface 58 extending between the pair of inner side walls 66 and between two spaced regions of second face 48 of annular body 41.

Each protuberance 42 and each indentation 46 in the present embodiment is curved in outline. The radially outermost points of protuberances 42 and the radially outermost points of indentations 46 lie on a circle having a center at center 61 of annular body 41. Protuberances 42 and indentations 46 are spaced apart by equal arc lengths. For the exemplary embodiment of the invention illustrated in FIG. 3, there are four protuberance and indentation pairs spaced apart by ninety degrees. The number of protuberances 42 and corresponding indentations 46 is not limited to four, but may be more or less. For example, the exemplary embodiment illustrated in FIG. 6 includes five protuberances 42 and corresponding indentations 46 (not shown).

Preferably, protuberances 42 and indentations 46 extend along a circle, shown by the dot-dash line 62, having a center at center 61 of annular body 41. The centers of curvature of the protuberance and indentation pairs need not be at center 61 of annular body 41. Instead, each protuberance and indentation pair can have a distinct center of curvature with a radius of curvature which is greater or less than the radius of circle 62. It is preferred that no portions of protuberances 42 extend radially outward beyond an outer periphery defined by contact surface 24 of head 22 when load indicator 40 is positioned adjacent fastener body 20.

Figure 4:
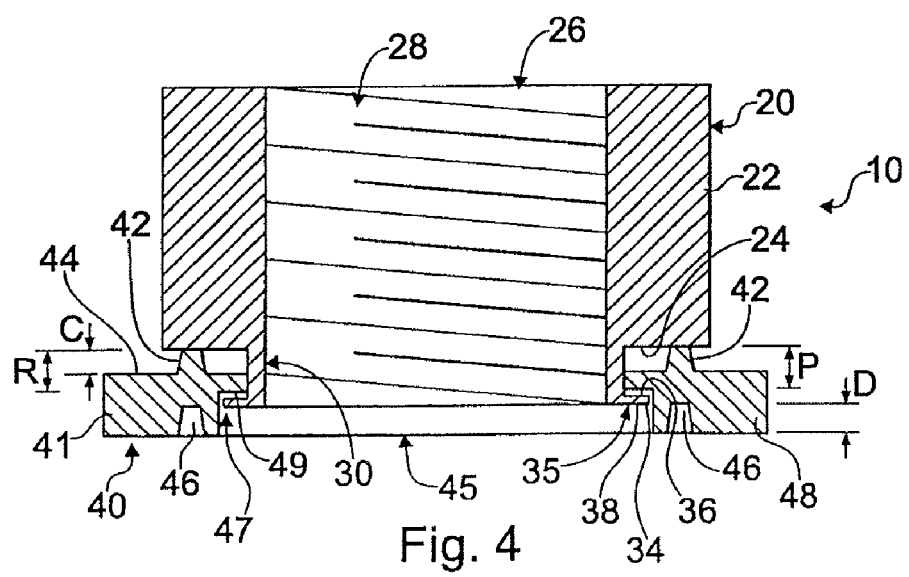
FIG. 4 is a cross-sectional view of the load indicating fastener of FIG. 1 after assembly.

Referring to FIG. 2, load indicator 40 has a through hole 45. Protuberances 42 and indentations 46 extend generally concentrically about through hole 45. Through hole 45 has an inside minimum diameter H that is slightly larger than the diameter S of the outside surface 32 of shank 30. Therefore, load indicator 40 can be positioned about shank outer surface 32, as illustrated in FIG. 4. In this exemplary embodiment, second face 48 of annular body 41 also includes an annular groove 47 about through hole 45. Annular groove 47 has an inside diameter G greater than through hole minimum diameter H. In this exemplary embodiment, annular groove 47 extends about half the thickness of annular body 41 such that a retainment shoulder 49 is defined within annular body 41 about through hole 45.

Referring to FIG. 4, after load indicator 40 has been positioned about shank 30, the free end 34 of shank 30 is deformed radially outward to define a radially extending member 35 having a pilot surface 36. Radially extending member 35 is received in annular groove 47 and pilot surface 36 engages retainment shoulder 49 to retain load indicator 40 on fastener body 20 such that load indicator 40 and fastener body 20 form a single unit. Deformation of shank free end 34 is controlled such that the distance P between pilot surface 36 and head contact surface 24 is greater than the distance R between retainment shoulder 49 and the crest (or top) of protuberances 42. Such a geometric relationship provides an assembled clearance between load indicator 40 and fastener body 20 such that load indicator 40 is rotatable relative to fastener body 20 while remaining captured on fastener body 20.

In addition, in this exemplary embodiment, annular groove 47 and radially extending member 35 are configured such that the distance D between the bottom surface 38 of radially extending member 35 and second face 48 of annular body 41, when protuberances 42 are in non-compressive contact with head contact surface 24, is greater than the height C of protuberances 42. Such a geometric relationship prevents bottom surface 38 from bottoming out upon collapse of protuberances 42. In an alternative exemplary embodiment, shank 30 is configured, for example, as a relatively thin-walled structure, such that even if bottom surface 38 bottoms out, shank free end 34 further deforms within the annular groove 47. Shank free end 34 may be deformed in various ways; for example, shank free end 34 may be deformed radially outward by stamping with one or more dies or using an orbital forming method whereby a specially shaped tool is rotated against shank free end 34 as pressure is applied. Other manufacturing methods may also be used.

Figure 5:
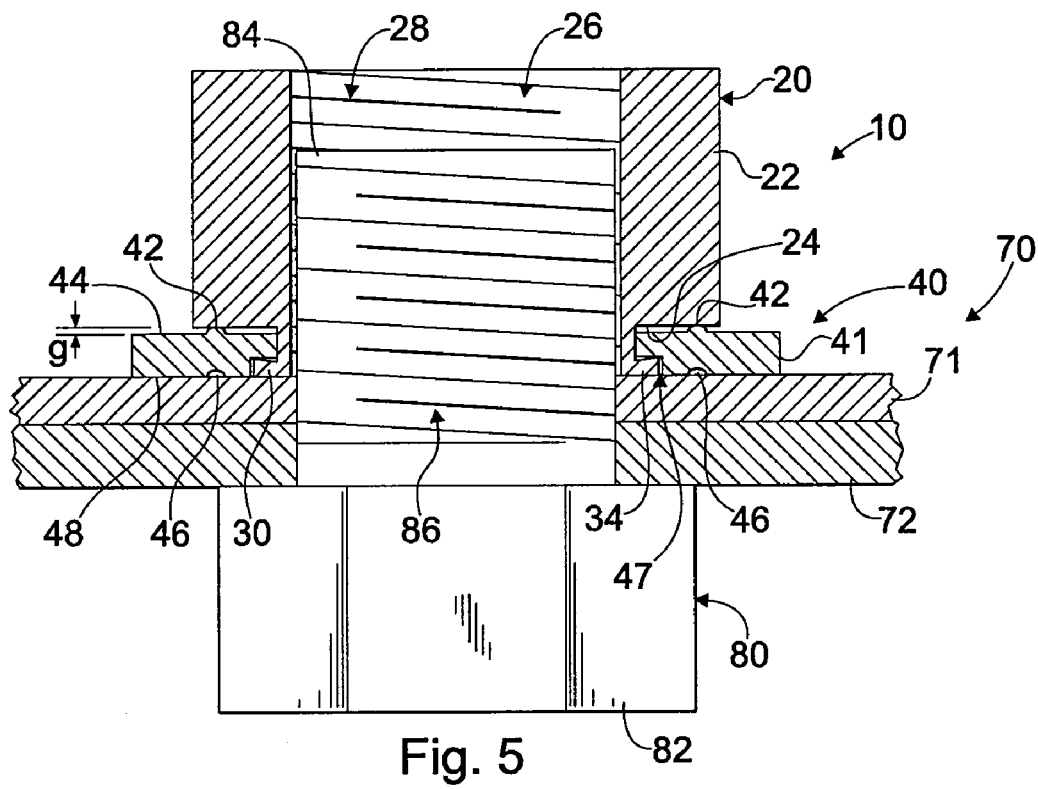
FIG. 5 is a cross-sectional view of a joint assembly in which the load indicating fastener of FIG. 1 has been tightened.

The use of load indicating fastener 10 illustrated in FIGS. 1-4 is shown in FIG. 5. An exemplary joint assembly 70, comprising a pair of joint members 71 and 72, load indicating fastener 10, and a secondary fastener 80, is assembled with the proper tension by use of load indicating fastener 10. In the present embodiment, secondary fastener 80 is a bolt having a head 82 and a shank 84 with a series of threads 86. Threaded shank 84 is extended through joint members 71 and 72. Threads 86 are engaged with threads 28 within through bore 26 of fastener body 20. Because load indicator 40 is formed as a single unit with fastener body 20, it can not be inadvertently omitted.

As secondary fastener 80 and fastener body 20 are threadably engaged with one another, protuberances 42 contact fastener body contact surface 24 and contact surface 24 begins to bear against the crests (or tops) of protuberances 42. Because radially extending member 35 is within annular groove 47 in the initially assembled configuration (see FIG. 4), shank 30 does not interfere with load indicator second face 48 engaging joint member 71 during tightening. Load indicator 40 is subjected to the clamping load between secondary fastener 80 and fastener body 20 as the joint is assembled and tightened either by driving secondary fastener 80 or fastener body head 22. As the tightening proceeds, protuberances 42 of load indicator 40 collapse back into their associated indentations 46 and the gap "g" between first face 44 of load indicator 40 and contact surface 24 of fastener body 20 is reduced. When this gap has been reduced a predetermined amount, as measured by a "feeler" gage, the tightening is stopped because the gap represents proper tensioning. (By "predetermined" is meant determined beforehand, so that the predetermined amount of gap reduction must be determined, i.e., chosen or at least known, before tightening begins.) The intended gap can have any desired height, including a zero height. In such a case, a zero clearance between first face 44 of load indicator 40 and contact surface 24 (i.e., the two surfaces are in contact with one another) will indicate proper tensioning and a feeler gage may not be required.

The intended gap represents proper tensioning because load indicator 40 and fastener body 20 are matched to one another such that protuberances 42 will plastically deform into annular body 41 when the compressive force applied to load indicator 40 has reached the desired tension. The selected load indicator 40 will have characteristics (for example, the number, size, and configuration of protuberances 42; the material and hardness of annular body 41; and the like) which, when tensioned by a fastener body 20 having selected characteristics (for example, size, material, contact surface hardness, thread pitch, thread type, and the like), will plastically deform and achieve the desired gap at an intended tension.

A number of advantages are achieved because a matched load indicator 40 is captured on fastener body 20. The risk of an end user mismatching a load indicator 40 with a fastener body 20, which may result in a false indication of tension, is eliminated. Furthermore, the risk of an end user improperly orienting load indicator 40 with respect to fastener body 20, for example, with protuberances 42 facing away from contact surface 24, is eliminated. Therefore, the compressive interface between protuberances 42 and contact surface 24 is assured and the gap "g" is consistently defined between first face 44 of load indicator 40 and contact surface 24. This results in greater consistency of assembly (i.e., load indicators 40 are not inadvertently omitted, improperly oriented, or duplicated) and consistency of load indication.

Figure 6:
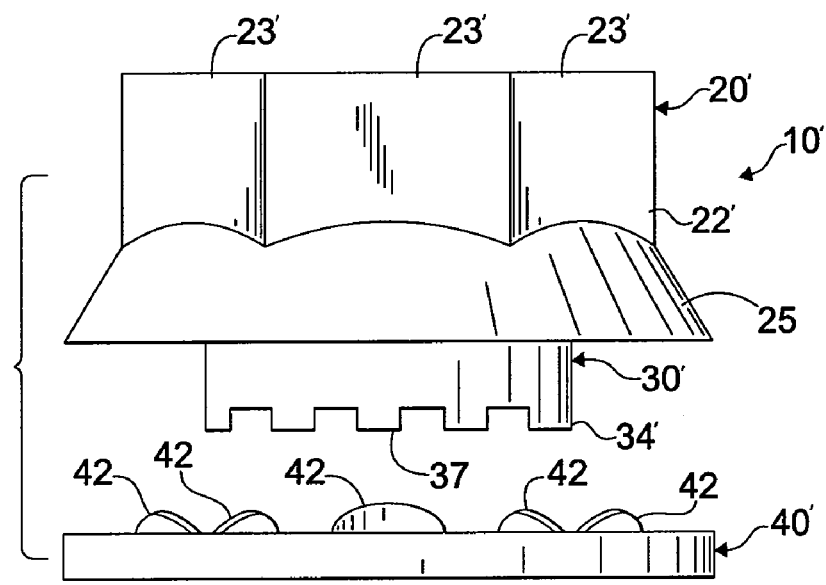
FIG. 6 is a side elevation view of a load indicating fastener in accordance with an alternative embodiment of the invention before assembly of the load indicator with the fastener body.

Referring to FIG. 6, load indicating fastener 10' that is an alternative exemplary embodiment of the present invention is shown. Load indicating fastener 10' is substantially the same as load indicating fastener 10 except for the differences described below. Load indicating fastener 10' includes a fastener body 20' and a load indicator 40'. Fastener body 20' includes a head 22' and a shank 30'. In this exemplary embodiment, head 22' has a hex flange configuration with an outwardly tapered flange 25 depending from engagement faces 23'.

The free end 34' of shank 30' defines a plurality of spaced tabs 37 which, as in the previous embodiment, are deformed outwardly to define radially extending members which engage load indicator retainment shoulder 49 and capture load indicator 40' relative to fastener body 20'. Tabs 37 minimize the amount of material required for manufacture and also reduce the amount of material received in annular groove 47. As few as two spaced apart tabs 37 may be used. Load indicator 40' is substantially the same as in the previous embodiment except that it includes five protuberances 42 and corresponding indentations 46 (not shown). Load indicating fastener 10' is assembled and used in the same manner as load indicating fastener 10 of the previous embodiment.

Figure 7:
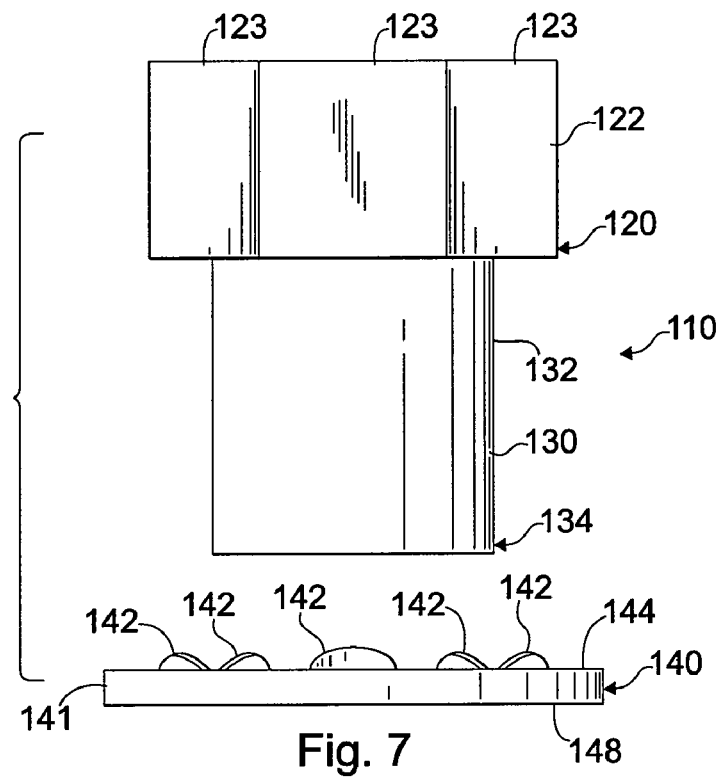
FIG. 7 is a side elevation view of a load indicating fastener in accordance with another alternative embodiment of the invention before assembly of the load indicator with the fastener body.
Figure 8:
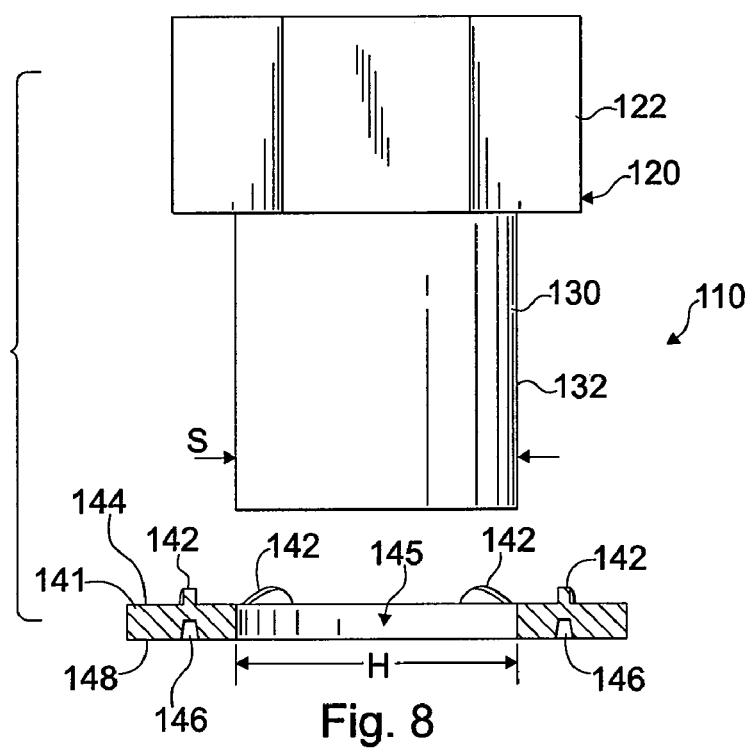
FIG. 8 is a view similar to FIG. 7 showing the load indicator in cross-section.
Figure 9:
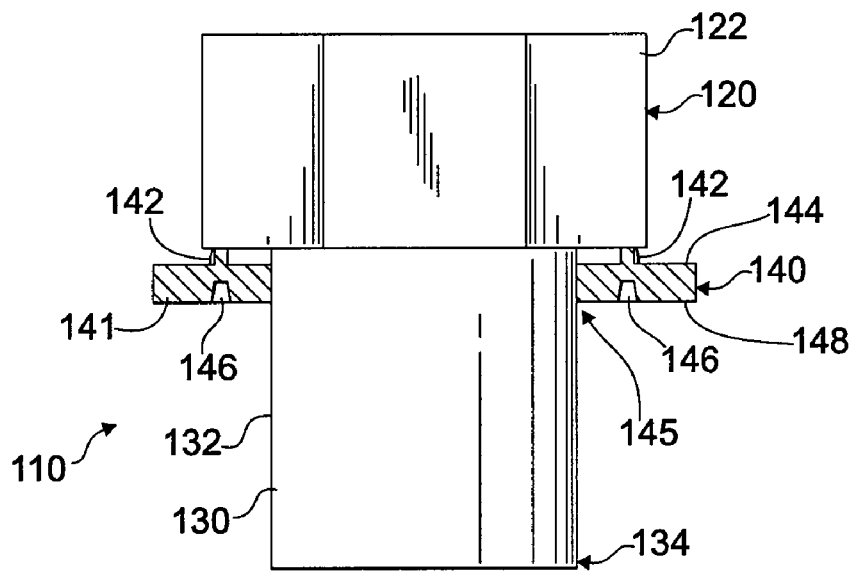
FIG. 9 is a view similar to FIG. 8 showing the load indicator positioned on the fastener body.
Figure 10:
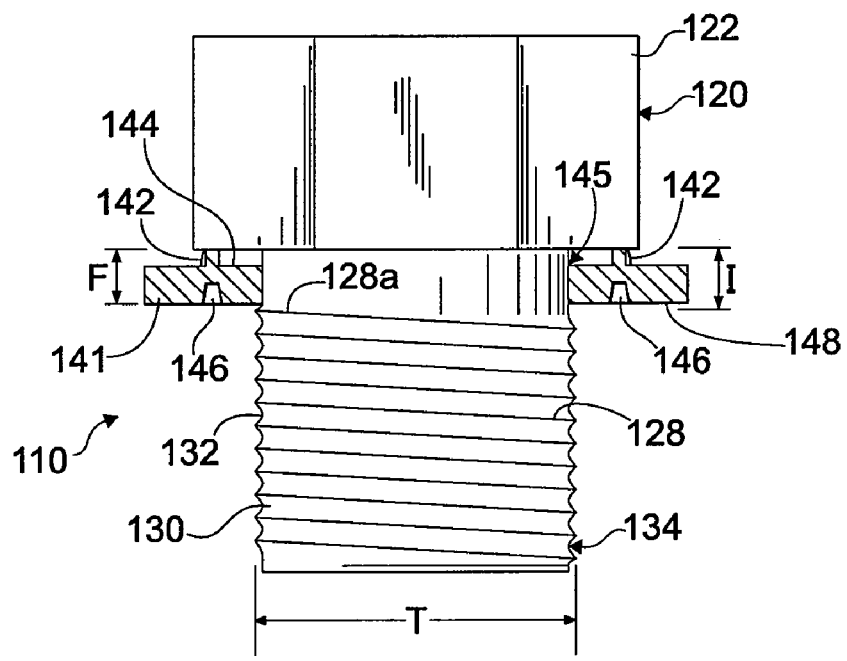
FIG. 10 is a view similar to FIG. 9 after final assembly of the load indicating fastener.

FIGS. 7-11 illustrate another exemplary embodiment of the load indicating fastener 110 according to the present invention. Load indicating fastener 110 generally comprises a fastener body 120 and a load indicator 140. In this exemplary embodiment, fastener body 120 is a bolt or screw which generally includes a head 122 having a contact surface 124 (see FIG. 11) with a shank 130 depending from the head 122. Head 122 and shank 130 are formed as an integral component. As illustrated in FIG. 10, the fully assembled load indicating fastener 110 includes a series of external threads 128 about shank 130. The illustrated head 122 has a hexagon configuration with six engagement faces 123 (only three are shown in FIG. 7). Other configurations may be used, however, in designing head 122. For example, but without limitation, head 122 may be square, straight hex head, hex flange, cap screw, or have a hexalobular internal driving feature. Fastener body 120 may be made to correspond with any desired standard, for example, metric, SAE, ASTM, or British standard. Furthermore, fastener body 120 may include friction modifiers or the like. Various other modifications may be made to fastener body 120 without departing from the scope of the invention.

Referring to FIG. 8, load indicator 140 in accordance with the present embodiment of the invention is substantially the same as the previous embodiments and includes an annular body 141 and a plurality of protuberances 142 integral with annular body 141 struck and partially sheared from annular body 141 to project from a first face 144 of annular body 141 and leave a corresponding plurality of indentations 146 in a second face 148 of annular body 141 opposite from first face 144. Load indicator 140 has a through hole 145 with protuberances 142 and indentations 146 extending generally concentrically about through hole 145. Through hole 145 has an inside minimum diameter H that is slightly larger than the diameter S of the outside surface 132 of shank 130. Therefore, load indicator 140 can be positioned about shank outer surface 132, as illustrated in FIG. 9. Load indicator 140 of this exemplary embodiment is distinct from the previous embodiments in that second face 148 of annular body 141 does not include an annular groove; instead, through hole 145 has the same general diameter through the thickness of annular body 141.

Referring to FIG. 10, in this exemplary embodiment, after load indicator 140 has been positioned about shank 130, shank 130 is rolled to form a plurality of threads 128. The diameter T at the crests of threads 128 is greater than the minimum inside diameter H of through hole 145. Consequently, upper-most thread 128a defines a radially extending member which engages second face 148 of annular body 141 to retain load indicator 140 on fastener body 120 such that load indicator 140 and fastener body 120 form a single unit. The rolling of threads 128 is controlled such that the distance I between upper-most thread 128a and head contact surface 124 is greater than the distance F between load indicator second face 148 and the crest of protuberances 142. This geometric relationship provides an assembled clearance between load indicator 140 and fastener body 120 such that load indicator 140 is rotatable relative to fastener body 120 while remaining captured on fastener body 120.

Figure 11:
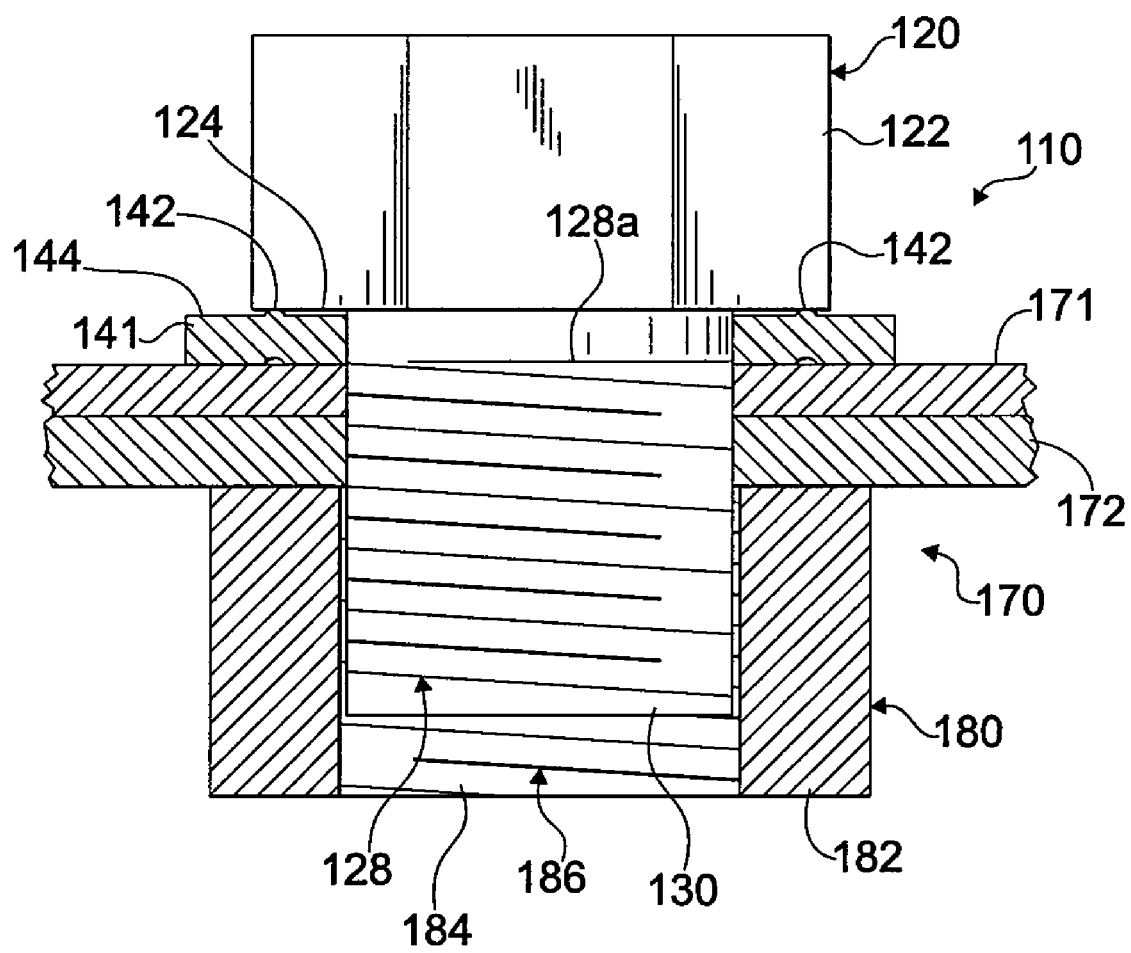
FIG. 11 is a cross-sectional view of a joint assembly in which the load indicating fastener of FIG. 7 has been tightened.

The use of load indicating fastener 110 of FIGS. 7-10 is shown in FIG. 11. An exemplary joint assembly 170, comprising a pair of joint members 171 and 172, load indicating fastener 110, and a secondary fastener 180, is assembled with the proper tension by use of load indicating fastener 110. In this exemplary embodiment, secondary fastener 180 is a nut having a head 182 defining a through bore 184 with a series of internal threads 186. Threaded shank 130 of load indicating fastener 110 is extended through joint members 171 and 172. Threads 128 are engaged with threads 186 within secondary fastener 180. Because load indicator 140 is formed in one piece with fastener body 120, it can not be inadvertently omitted.

As secondary fastener 180 and fastener body 120 are threadably engaged with one another, protuberances 142 contact fastener body contact surface 124 and contact surface 124 begins to bear against the tops of protuberances 142. As tightening continues, load indicator 140 is subjected to the clamping load between secondary fastener 180 and fastener body 120 as the joint is assembled and tightened either by driving secondary fastener 180 or fastener body head 122. As the tightening proceeds, protuberances 142 of load indicator 140 collapse back into their associated indentations 146 and the gap between first face 144 of load indicator 140 and contact surface 124 of fastener body 120 is reduced. Because second face 148 of load indicator 140 moves away from threads 128 during tightening, as illustrated in FIG. 11, there is no risk of load indicator 140 interfering with tightening. When the gap has been reduced a predetermined amount, as measured by a feeler gage, the tightening is stopped because the gap represents proper tensioning. The intended gap can have any desired height, including a zero height. In such a case, a zero clearance between first face 144 of load indicator 140 and contact surface 124 (i.e., the two surfaces are in contact with one another) will indicate proper tensioning and a feeler gage may not be required.

The intended gap represents proper tensioning because load indicator 140 and fastener body 120 are matched to one another such that protuberances 142 will plastically deform into annular body 141 when the compressive force applied to load indicator 140 has reached the desired tension. The selected load indicator 140 will have characteristics (for example, the number, size, and configuration of protuberances 142; the material and hardness of annular body 141; and the like) which, when tensioned by a fastener body 120 having selected characteristics (for example, size, material, contact surface hardness, thread pitch, thread type, and the like), will plastically deform and achieve the desired gap at an intended tension.

A number of advantages are achieved because a matched load indicator 140 is captured on fastener body 120. The risk of an end user mismatching a load indicator 140 with a fastener body 120, which may result in a false indication of tension, is eliminated. Furthermore, the risk of an end user improperly orienting load indicator 140 with respect to fastener body 120, for example, with protuberances 142 facing away from contact surface 124, is eliminated. Therefore, the compressive interface between protuberances 142 and contact surface 124 is assured and the gap "g" is consistently defined between first face 144 of load indicator 140 and contact surface 124. This results in greater consistency of assembly (i.e., load indicators 140 are not inadvertently omitted, misoriented, or duplicated) and consistency of load indication.

As noted above, it is desirable to maintain the combination of matched load indicator 40, 40', 140 and corresponding fastener body 20, 20', 120 as a single unit load indicating fastener 10, 10', 110. The combination can be maintained, with load indicator 40, 40', 140 captured on fastener body 20, 20', 120, using a number of mechanisms. Some of these mechanisms have been discussed above; additional embodiments of securing mechanisms for load indicating fasteners 10, 10', 110 are illustrated in FIGS. 12-22 and discussed below.

Figure 12:
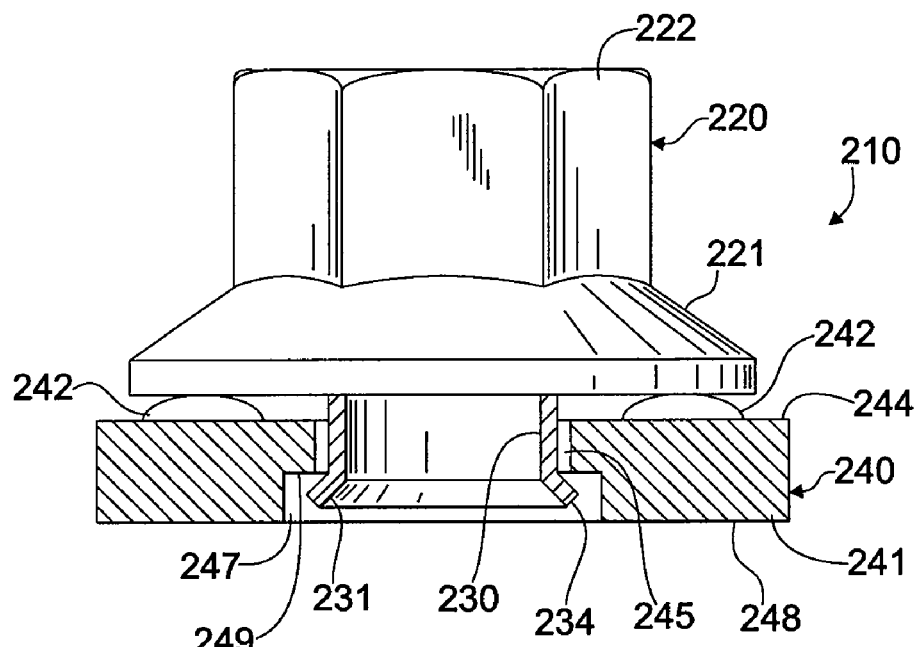
FIG. 12 illustrates an embodiment of a mechanism that secures the load indicator to the fastener body according to the present invention.

Turning first to FIG. 12, and as for the embodiments discussed above, the load indicating fastener 210 includes a fastener body 220 coupled with a load indicator 240. Fastener body 220 includes three integral components: a head 222, a flange 221 extending from head 222, and a shank 230. Shank 230 extends at its top from flange 221 to a free end 234. Load indicator 240 has a plurality of protuberances 242 extending beyond its first face 244 and an annular body 241 defining a through hole 245 and an annular groove 247. In the area of shank 230 proximate free end 234 of shank 230, a flare 231 is provided. Flare 231 can be produced by any one of a number of conventional methods including, for example, staking or orbital forming. Flare 231 engages the retainment shoulder 249 to loosely (i.e., load indicator 240 is free to rotate about shank 230) secure load indicator 240 to fastener body 220. In an embodiment of load indicator 240 devoid of annular groove 247, flare 231 either engages the second face 248 of load indicator 240 after traversing through hole 245 or contacts the inner surface of through hole 245 creating a friction securement.

Figure 13:
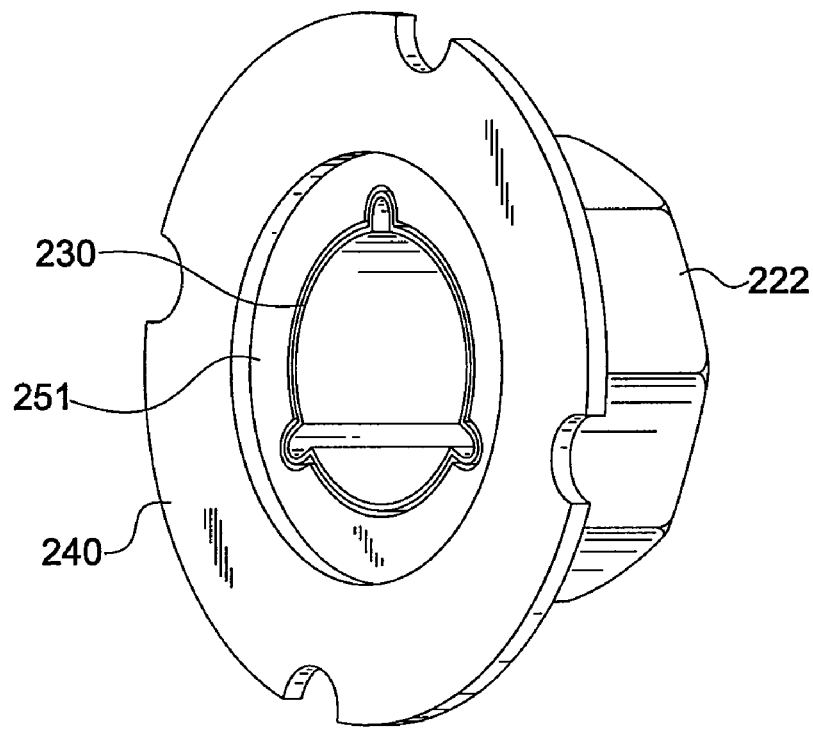
FIG. 13 illustrates another embodiment of a mechanism that secures the load indicator to the fastener body according to the present invention.

A similar embodiment of the securing mechanism is illustrated in FIG. 13. As shown, free end 234 of shank 230 is bent or cut outward to produce a flare, stake, or form 251 in one or more places. Thus, the free end 234 of shank 230 is distorted to create material that captures load indicator 240. Again, load indicator 240 is loosely secured to fastener body 220.

Figure 14:
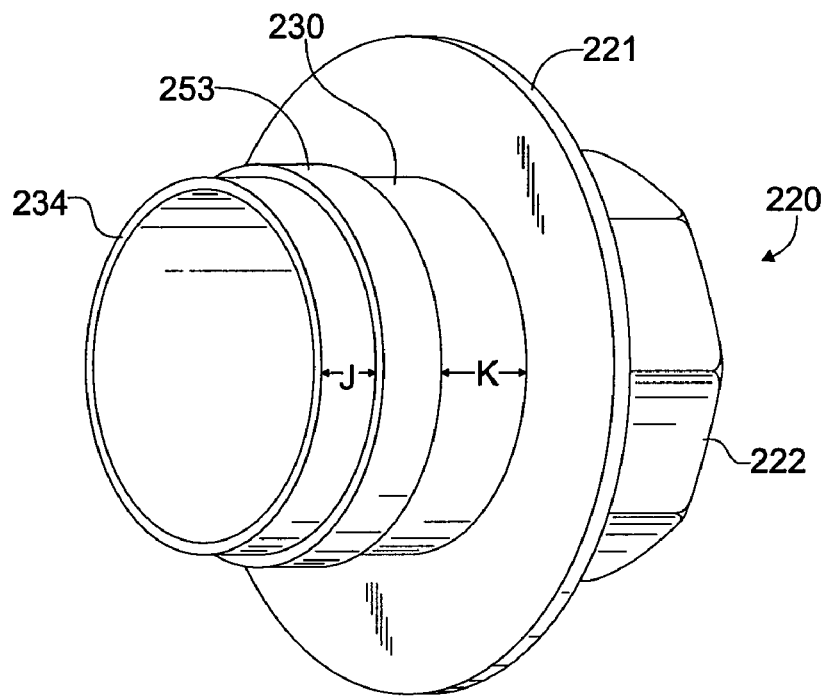
FIG. 14 illustrates yet another embodiment of a mechanism that secures the load indicator to the fastener body according to the present invention.

As shown in FIG. 14, shank 230 of fastener body 220 may be provided with a bulge or step ring 253 located between free end 234 and flange 221. Step ring 253 may be located so that a distance J exists between step ring 253 and free end 234 and a distance K exists between step ring 253 and flange 221. The area between free end 234 and step ring 253 defined by distance J provides space initially to drop load indicator 240 onto fastener body 220. Load indicator 240 will rest on step ring 253, with first face 244 of load indicator 240 engaging the bottom of step ring 253. Then load indicator 240 is pressed over step ring 253 until load indicator 240 resides in the area between step ring 253 and flange 221 defined by distance K with second face 248 of load indicator 240 engaging the top of step ring 253. In this position, load indicator 240 is loosely secured to fastener body 220.

Figure 15:
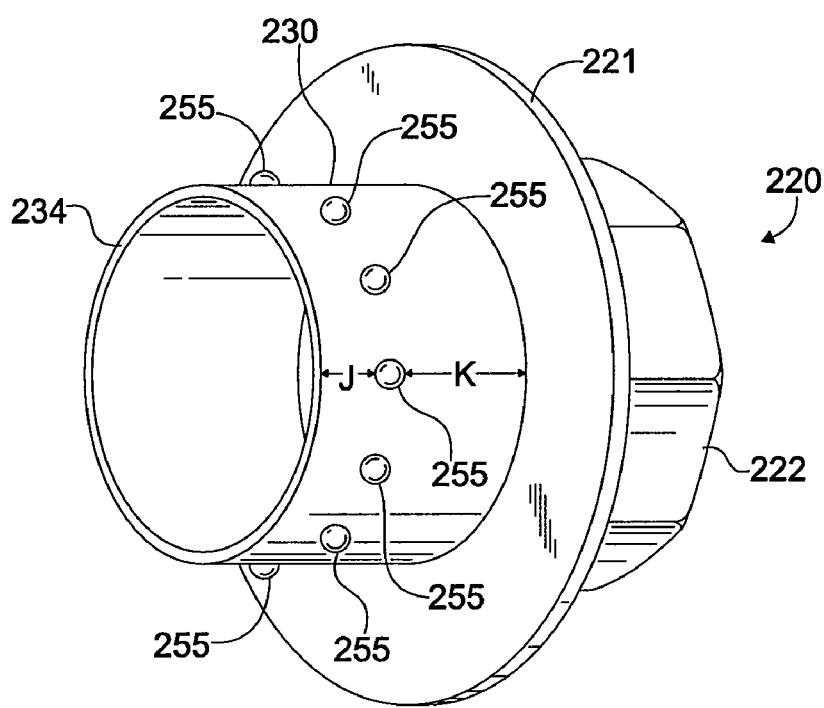
FIG. 15 illustrates still another embodiment of a mechanism that secures the load indicator to the fastener body according to the present invention.

An embodiment of the securing mechanism similar to that of FIG. 14 is illustrated in FIG. 15. Rather than the single step ring 253 of FIG. 14, the embodiment of FIG. 15 includes a series of bumps 255 formed on shank 230 of fastener body 220. Any number of bumps 255 suffices, although it is preferred that bumps 255 be dispersed substantially uniformly around the periphery of shank 230 so that load indicator 240 is not skewed when it rests on bumps 255. Bumps 255 may be located so that a distance J exists between bumps 255 and free end 234 and a distance K exists between bumps 255 and flange 221. Similarly to the embodiment of FIG. 14, the area between free end 234 and bumps 255 defined by distance J provides space initially to drop load indicator 240 onto fastener body 220. Load indicator 240 will rest on bumps 255, with first face 244 of load indicator 240 engaging the bottom of bumps 255. Then load indicator 240 is pressed over bumps 255 until load indicator 240 resides in the area between bumps 255 and flange 221 defined by distance K with second face 248 of load indicator 240 engaging the top of bumps 255. In this position, load indicator 240 is loosely secured to fastener body 220.

Figure 16:
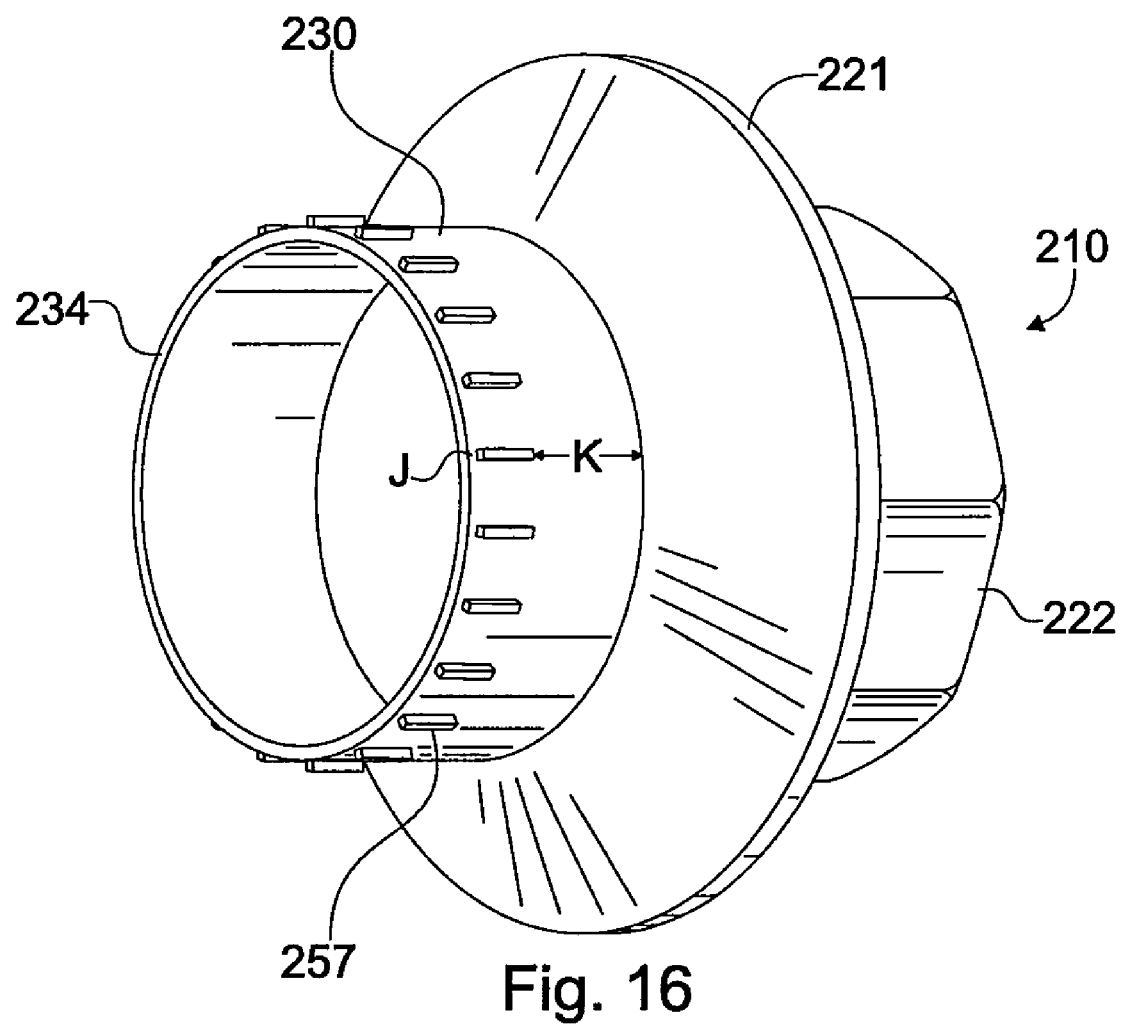
FIG. 16 illustrates a further embodiment of a mechanism that secures the load indicator to the fastener body according to the present invention.

Another similar embodiment of the securing mechanism is illustrated in FIG. 16. In this embodiment, a knurl 257 is rolled on the edge of shank 230 of fastener body 220. Standard knurling tools can be used to create knurl 257. Knurl 257 may be located so that a distance J exists between knurl 257 and free end 234 and a distance K exists between knurl 257 and flange 221. Similarly to the embodiments of FIGS. 14 and 15, the area between free end 234 and knurl 257 defined by distance J provides space initially to drop load indicator 240 onto fastener body 220. Load indicator 240 will rest on knurl 257, with first face 244 of load indicator 240 engaging the bottom of knurl 257. Then load indicator 240 is pressed over knurl 257 until load indicator 240 resides in the area between knurl 257 and flange 221 defined by distance K with second face 248 of load indicator 240 engaging the top of knurl 257. In this position, load indicator 240 is loosely secured to fastener body 220.

Figure 17A:
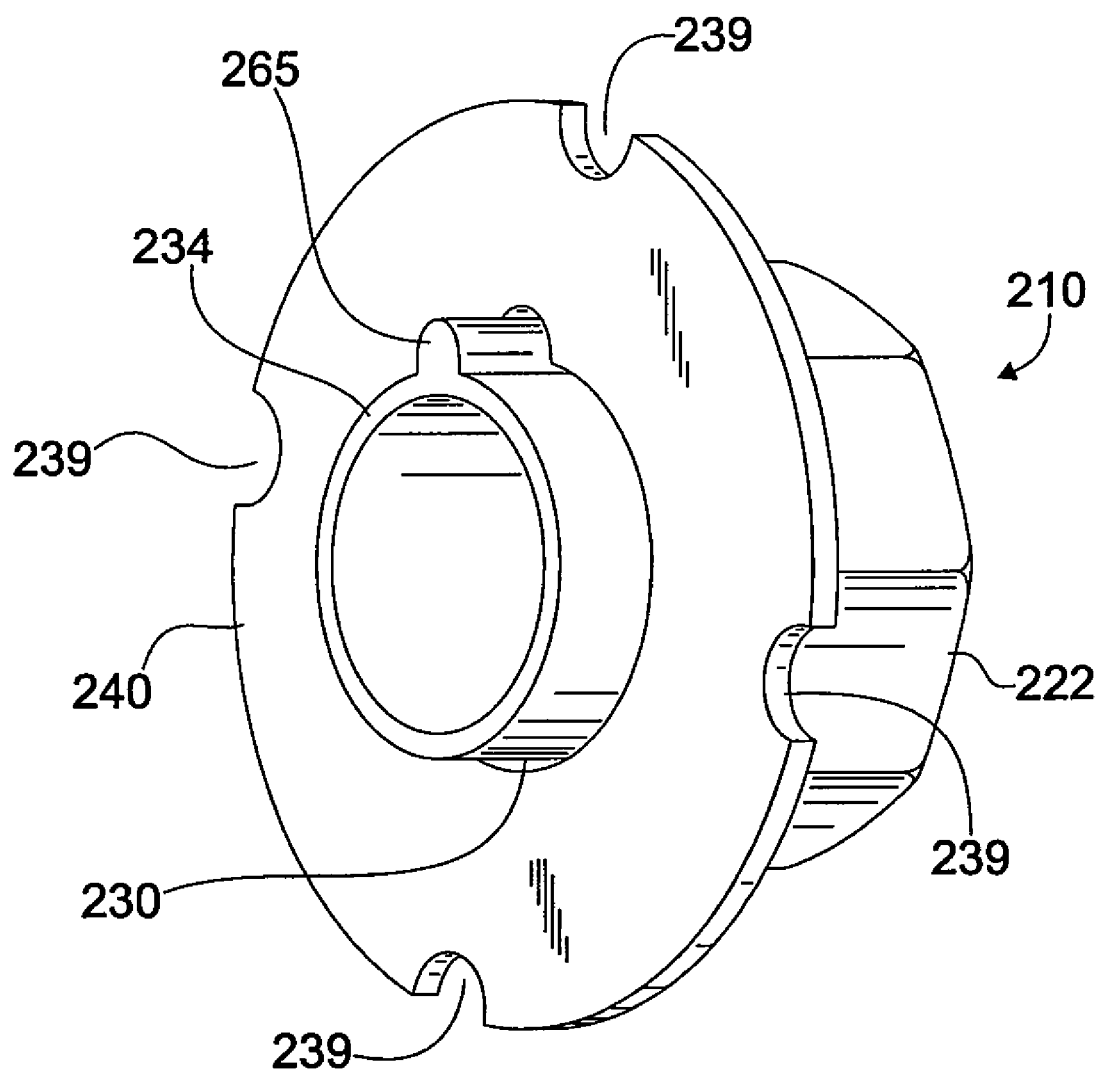
FIG. 17A is a perspective view of a load indicating fastener including another embodiment of a mechanism that secures the load indicator to the fastener body according to the present invention.
Figure 17B:
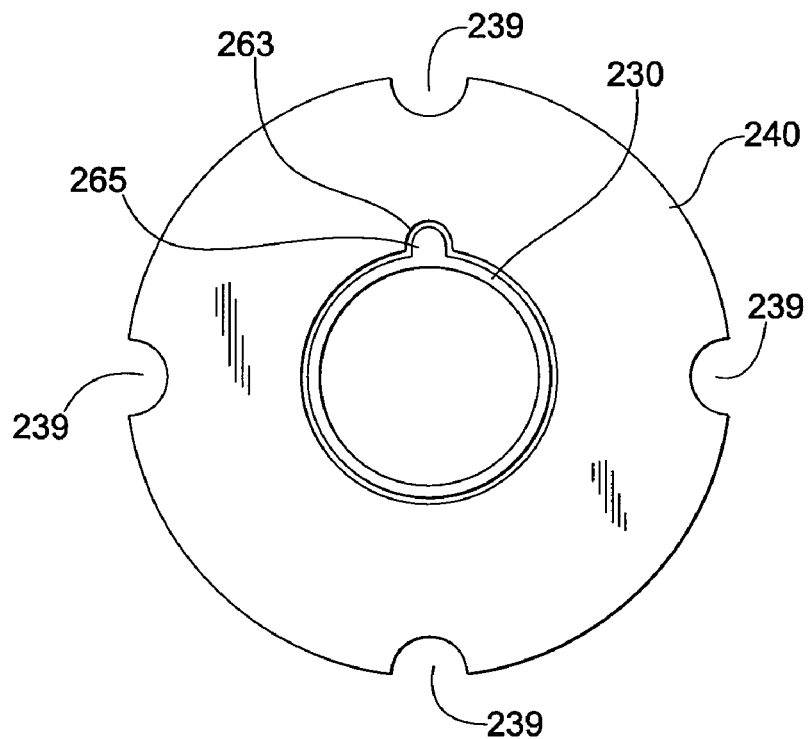
FIG. 17B is a bottom view of the load indicating fastener shown in FIG. 17A with the load indicator partially secured to the fastener body.
Figure 17C:
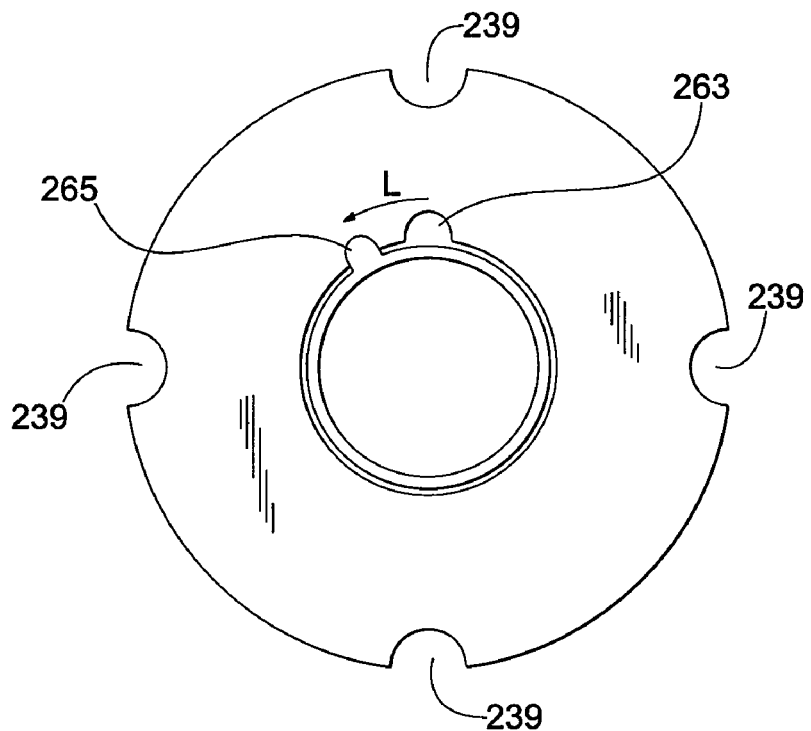
FIG. 17C is a bottom view of the load indicating fastener shown in FIG. 17A with the load indicator fully secured to the fastener body.

FIGS. 17A, 17B, and 17C illustrate yet another embodiment of a securing mechanism according to the present invention. Shank 230 of the fastener body 220 of the load indicating fastener 210 has a key 265. Key 265 protrudes from the surface of shank 230 a small distance, on the order of about 0.002 inches (0.05 mm), and extends along the length of shank 230 from free end 234 to flange 221 (not shown). Load indicator 240 has a keyhole 263 that corresponds geometrically with key 265 of fastener body 220. A single key 265 and keyhole 263 may be provided, as illustrated, or multiple keys 265 and corresponding keyholes 263 may be provided.

To couple load indicator 240 onto fastener body 220, load indicator 240 is slipped into engagement with fastener body 220 by aligning key 265 with keyhole 263 and pushing load indicator 240 toward flange 221 (not shown) of fastener body 220. This coupled position is illustrated in the bottom view of FIG. 17B. When in the position of FIG. 17B, load indicator 240 is partially secured on fastener body 220: rotational movement of load indicator 240 is prevented while longitudinal movement of load indicator 240 along the length of shank 230 is possible. Load indicator 240 can be fully held in position and kept from rotating, as shown in FIG. 17C, by engaging the notches 239 around the periphery of load indicator 240 with a suitable tool. While load indicator 240 is held, fastener body 220 is twisted or rotated, by applying force along the direction of arrow L, until key 265 deforms slightly, exits keyhole 263, and engages the inner surface of through hole 245 of load indicator 240 via an interference fit. This interference fit secures load indicator 240 to fastener body 220. Additional rotation of fastener body 220 relative to load indicator 240 will smash key 265 sufficiently so that load indicator 240 rotates freely with respect to fastener body 220. It is also possible to design key 265 so that rotation of fastener body 220 with respect to load indicator 240 shears (rather than smashes) key 265; such a design has the disadvantage, however, of creating an excess piece of material (i.e., sheared key 265).

Figure 18:
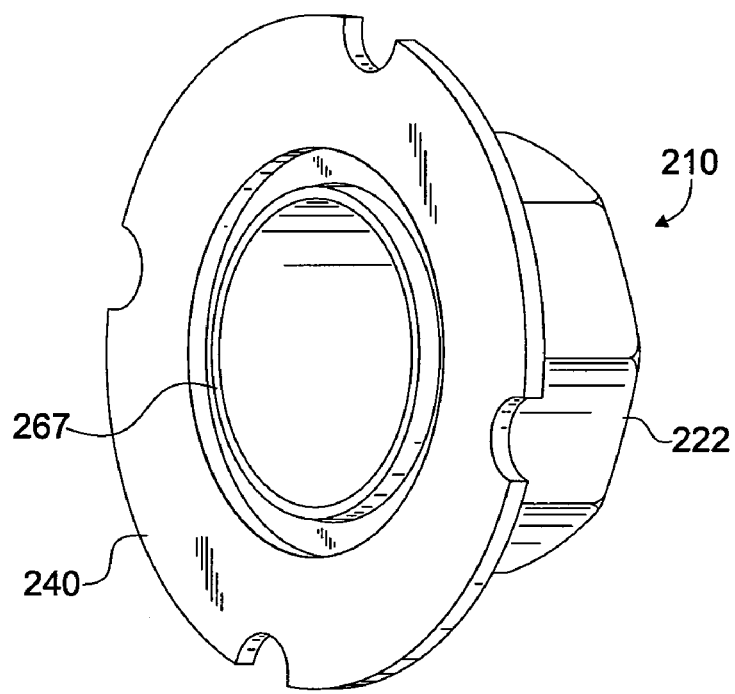
FIG. 18 illustrates an embodiment of the securing mechanism based upon a full interference fit between the load indicator and the fastener body.

FIG. 18 illustrates an embodiment of the securing mechanism based upon a full interference fit between load indicator 240 and fastener body 220. A chamfer 267 is provided at free end 234 of shank 230 of fastener body 220. Through hole 245 of load indicator 240 has an inside minimum diameter H slightly smaller than the outside diameter S of shank 230. A suitable difference in the diameters H and S is about 0.005 inches (0.13 mm). When load indicator 240 is initially coupled to fastener body 220, chamfer 267 facilitates engagement between the components (i.e., free end 234 fits within through hole 245). As load indicator 240 is pressed onto fastener body 220 and clears chamfer 267, an interference fit is created between the smaller diameter H of load indicator 240 and the larger diameter S of fastener body 220. This interference fit allows the coupled load indicating fastener 210 to be packaged, transported, and delivered without risk of separation between load indicator 240 and fastener body 220. On site and during installation, force applied to fastener body 220 by the user overcomes the interference fit and breaks load indicator 240 free from fastener body 220 so that load indicator 240 can freely rotate about fastener body 220.

Figure 19:
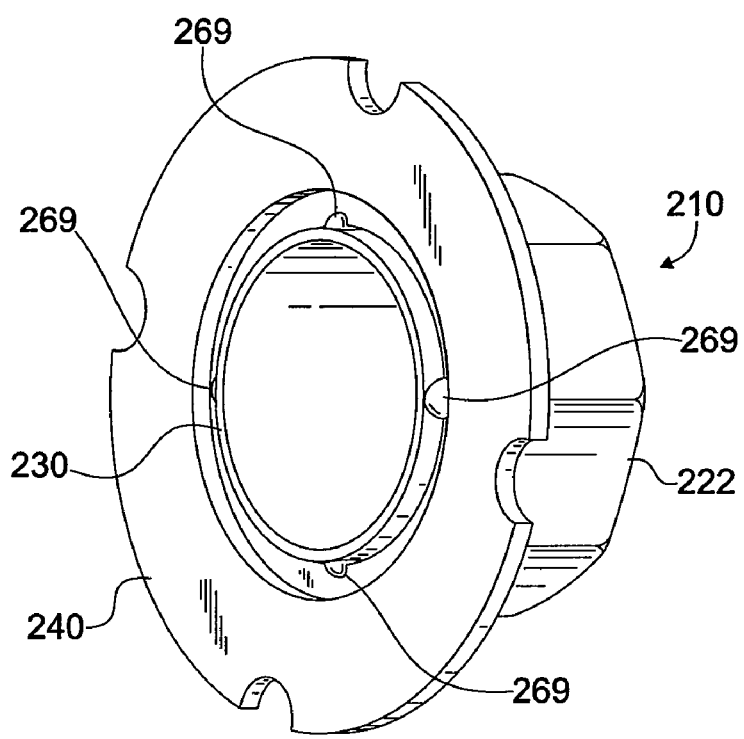
FIG. 19 illustrates a modified version (partial interference fit) of the embodiment of the securing mechanism shown in FIG. 18.

FIG. 19 illustrates a modified version of the embodiment of the securing mechanism shown in FIG. 18. In the embodiment of FIG. 19, the securing mechanism is based upon a partial or localized interference fit between load indicator 240 and fastener body 220. One or more lobes 269 is or are provided on the inside surface of load indicator 240 forming through hole 245. In this embodiment, through hole 245 of load indicator 240 has an inside minimum diameter H slightly larger than the outside diameter S of shank 230 but the diameter of the imaginary circle formed by connecting the crowns or tops of lobes 269 is slightly smaller than the outside diameter S of shank 230. Thus, lobes 269 contact the outside surface of shank 230 of fastener body 220 when load indicator 240 is coupled with (i.e., pressed onto) fastener body 220. A localized interference fit is created between load indicator 240 and fastener body 220 where lobes 269 contact shank 230. As for the previous embodiment, force applied to fastener body 220 by the user on site and during installation overcomes the localized or partial interference fit and breaks load indicator 240 free from fastener body 220 so that load indicator 240 can freely rotate about fastener body 220.

FIG. 19 illustrates lobes 269 formed on load indicator 240. The same effect can be achieved by providing lobes 269 on shank 230 rather than on load indicator 240. In such a variation, lobes 269 may extend along the length of shank 230 between free end 234 and flange 221. Any number of lobes 269 suffices, although it is preferred that lobes 269 be dispersed substantially uniformly around the periphery of shank 230 so that load indicator 240 is not skewed when it engages lobes 269. In this variation, through hole 245 of load indicator 240 has an inside minimum diameter H slightly larger than the outside diameter S of shank 230 but slightly smaller than the diameter of the imaginary circle formed by connecting the crowns or tops of lobes 269. Thus, lobes 269 contact the inside surface of through hole 245 of load indicator 240 when load indicator 240 is coupled with (i.e., pressed onto) fastener body 220.

Figure 20:
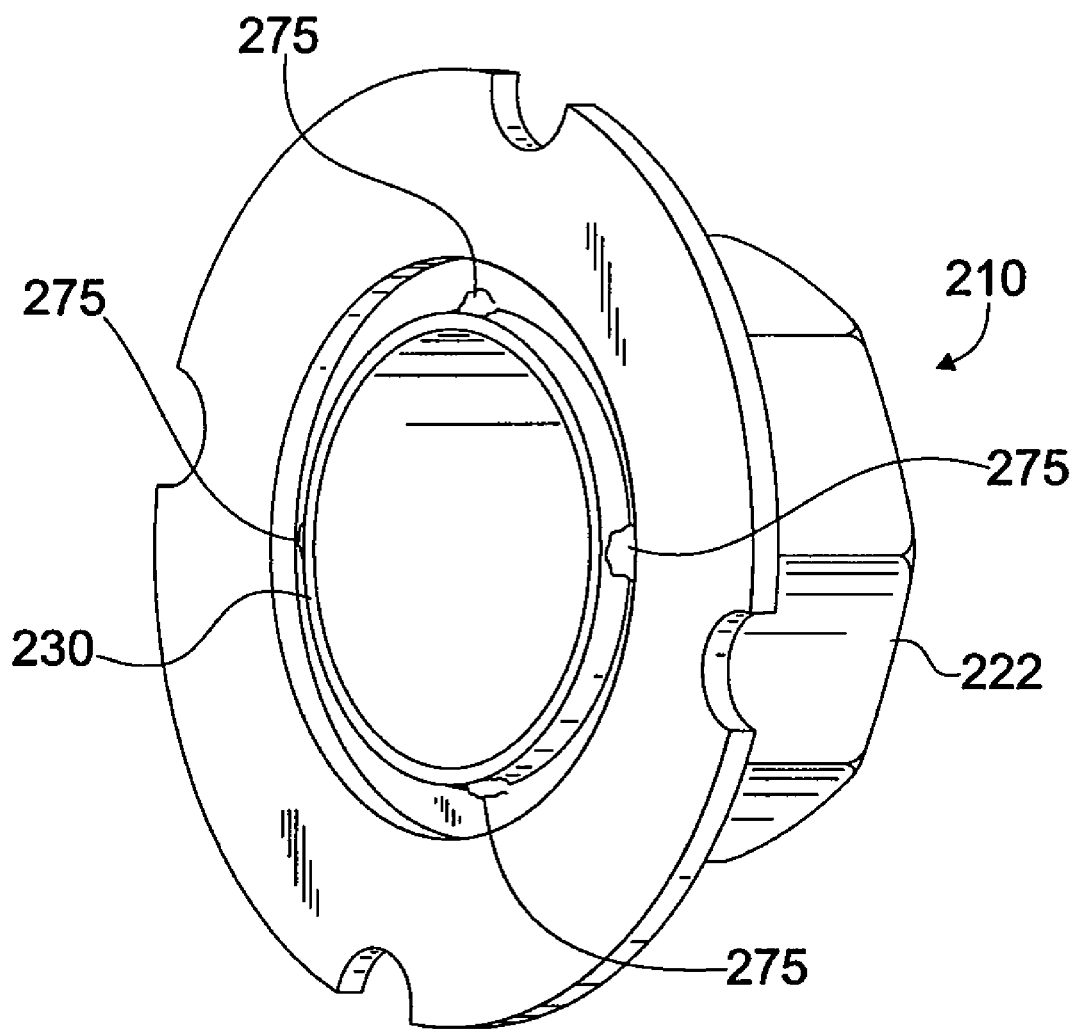
FIG. 20 illustrates an enhancement to the embodiment of the securing mechanism shown in FIG. 19, including a welded interconnection.

FIG. 20 illustrates an enhancement to the embodiment of the securing mechanism shown in FIG. 19. The initial structure of the enhanced embodiment is identical to that of the embodiment of FIG. 19. Thus, one or more lobes 269 is or are provided on the inside surface of load indicator 240 forming through hole 245 (or, alternatively, on shank 230). Lobes 269 contact the outside surface of shank 230 of fastener body 220 when load indicator 240 is coupled with (i.e., pressed onto) fastener body 220. A localized interference fit is created between load indicator 240 and fastener body 220 where lobes 269 contact shank 230. Care must be taken to assure that load indicator 240 is not pressed so far onto fastener body 220 that protuberances 242 of load indicator 240 contact flange 221 of fastener body 220 (i.e., a space or gap must exist between protuberances 242 and flange 221).

While load indicator 240 and fastener body 220 are coupled, current is applied to lightly tack weld lobes 269 to shank 230 at the points of contact between lobes 269 and shank 230. The welded interconnections 275 between lobes 269 and shank 230 enhance the engagement between load indicator 240 and fastener body 220 beyond a mere localized interference fit. It is important that the only metal contacts between load indicator 240 and fastener body 220 exist at the points of contact between lobes 269 and shank 230 so that the ultimate functionality and performance of load indicating fastener 210 is not affected by the method of creating the welded securing mechanism. Force applied to fastener body 220 by the user on site and during installation overcomes the welded interconnections 275 and breaks load indicator 240 free from fastener body 220 so that load indicator 240 can freely rotate about fastener body 220. It is also possible, of course, to create a single welded interconnection around the entire periphery of shank 230 by applying current to the full interference fit embodiment of the securing mechanism illustrated in FIG. 18.

Figure 21A:
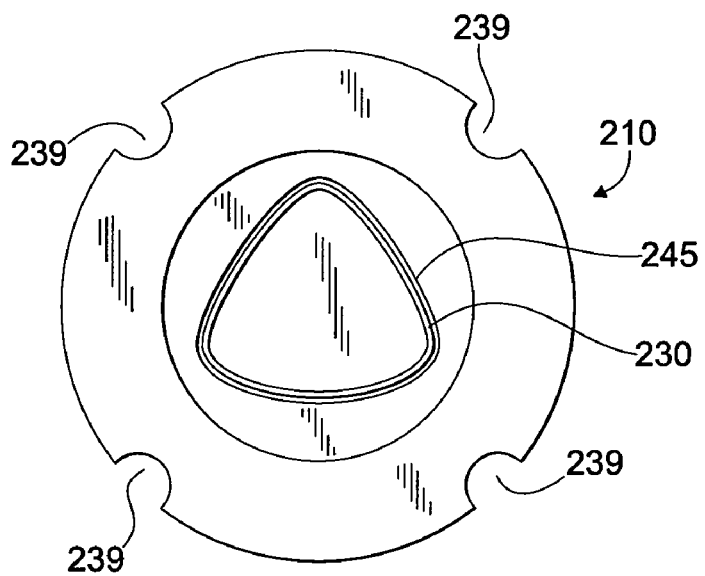
FIGS. 21A and 21B illustrate yet another embodiment of the securing mechanism based on a shaped through hole of the load indicator and a correspondingly shaped shank of the fastener body.
Figure 21B:
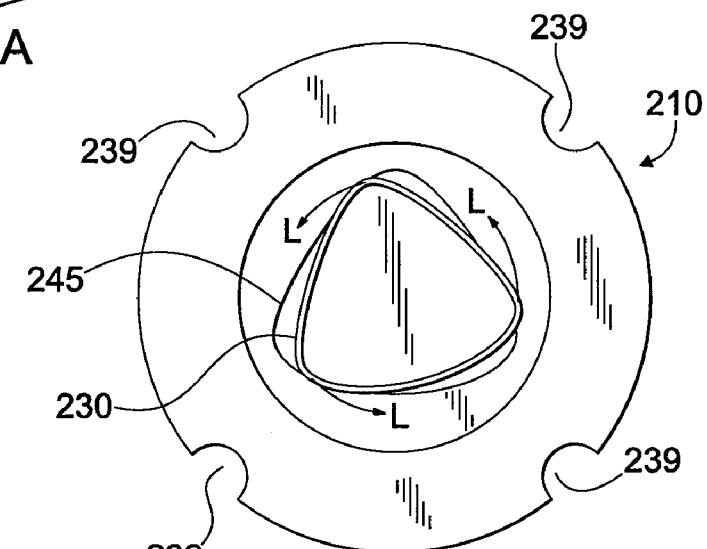

FIGS. 21A and 21B illustrate yet another embodiment of the securing mechanism based on a shaped through hole 245 of load indicator 240 and a correspondingly shaped shank 230 of fastener body 220. The corresponding shapes permit a twist lock between the components. Although a number of shapes are possible, in the particular example shown in FIGS. 21A and 21B through hole 245 defines a tri-lobed opening. (Single as well as multiple lobe versions are envisioned.) Shank 230 is formed with a corresponding tri-lobed outer surface. To couple load indicator 240 on fastener body 220, the shapes are aligned as shown in FIG. 21A and load indicator 240 is slid onto shank 230 of fastener body 220. Load indicator 240 can be fully held in position, and kept from rotating, by engaging notches 239 around the periphery of load indicator 240 with a suitable tool. While load indicator 240 is held, fastener body 220 is twisted or rotated approximately 60 degrees, by applying force along the direction of arrows L in FIG. 21B, until an interference fit is created between the inner surface of through hole 245 of load indicator 240 and the outer surface of shank 230 of fastener body 220. This interference fit secures load indicator 240 to fastener body 220. The lobe crest height is predetermined to create enough interference to maintain the coupled assembly during packaging, transport, and delivery to the installation site. Additional rotation of fastener body 220 relative to load indicator 240 upon installation will round the lobes of the geometries sufficiently so that load indicator 240 rotates freely with respect to fastener body 220. In a variation of the embodiment, fastener body 220 may be rotated beyond 60 degrees (360 degrees or more) during assembly. Such extensive rotation would deform a groove in shank 230 able to hold load indicator 240 loosely.

Figure 22:
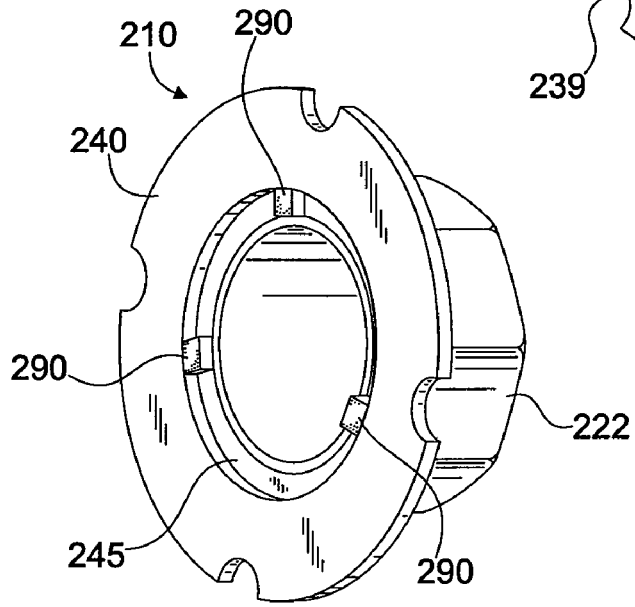
FIG. 22 is a perspective view of a load indicating fastener including an adhesive patch as the embodiment of a mechanism that secures the load indicator to the fastener body according to the present invention.

FIG. 22 is a perspective view of load indicating fastener 210 including an adhesive patch 290 as the embodiment of a mechanism that secures load indicator 240 to fastener body 220 according to the present invention. Adhesive patch 290 may be affixed (e.g., glued) to one or both of (a) the inside surface of through hole 245 of load indicator 240, and (b) the outside surface of shank 230 of fastener body 220. Moreover, adhesive patch 290 may be affixed to one or more locations on the component or components. It is important that neither adhesive patch 290 nor any glue present on adhesive patch 290 contact first face 244 of load indicator 240; such contact might compromise the function and performance of load indicating fastener 210. As with other embodiments, adhesive patch 290 allows the coupled load indicating fastener 210 to be packaged, transported, and delivered without risk of separation between load indicator 240 and fastener body 220. On site and during installation, force applied to fastener body 220 by the user will tear open adhesive patch 290 and break load indicator 240 free from fastener body 220 so that load indicator 240 can freely rotate about fastener body 220.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

The invention claimed is:

1. A load indicating fastener comprising:
   a load indicator including:
      an annular body having an inner surface defining a through hole with an inner diameter, and
      a plurality of protuberances integral with the annular body struck and partially sheared from the annular body to project from a first face of the annular body and leave a corresponding plurality of indentations in a second face of the annular body opposite from the first face;
   a fastener body including:
      a head defining a contact surface; and
      a shank depending from the contact surface at its top and having a free end opposite the top and an outside surface with an outer diameter and a radially extending member with a bottom surface; and
   a securing mechanism including the radially extending member and retaining the load indicator on the shank of the fastener body with the protuberances proximate to and in alignment with the contact surface, the protuberances having an uncompressed height such that the distance between the bottom surface of the radially extending member and the second face is greater than the height when the protuberances are in non-compressive contact with the contact surface.

2. The load indicating fastener according to claim 1 wherein the securing mechanism includes a plurality of spaced apart tabs extending outwardly from the free end of the shank.

3. The load indicating fastener according to claim 1 wherein the outside surface of the shank of the fastener body has a series of threads and the securing mechanism includes at least one thread having a crest diameter greater than the inner diameter of the through hole.

4. The load indicating fastener according to claim 1 wherein the securing mechanism includes at least one flare, stake, or form radially extending outwardly from the free end of the shank.

5. The load indicating fastener according to claim 1 wherein the securing mechanism includes a step ring disposed on the outside surface of the shank of the fastener body and located between the free end and the top so that a first distance exists between the step ring and the free end and a second distance exists between the step ring and the top.

6. The load indicating fastener according to claim 1 wherein the securing mechanism includes a series of bumps disposed on the outside surface of the shank of the fastener body and located between the free end and the top so that a first distance exists between the bumps and the free end and a second distance exists between the bumps and the top.

7. The load indicating fastener according to claim 1 wherein the securing mechanism includes a knurl disposed on the outside surface of the shank of the fastener body and located between the free end and the top so that a first distance exists between the knurl and the free end and a second distance exists between the knurl and the top.

8. The load indicating fastener according to claim 1 wherein the securing mechanism includes a key disposed on the outside surface of the shank of the fastener body, releasably engaging a keyhole formed in the load indicator, the key and keyhole having corresponding geometries and the key engaging the inner surface of the through hole to create an interference fit.

9. The load indicating fastener according to claim 1 wherein the securing mechanism includes a chamfer provided at the free end of the shank of the fastener body and an interference fit created between the inner surface of the through hole of the load indicator and the outside surface of the shank of the fastener body, the inner surface having an inner diameter slightly smaller than the outer diameter of the outside surface.

10. The load indicating fastener according to claim 1 wherein the securing mechanism includes one or more lobes provided on the inner surface defining the through hole of the load indicator and a localized interference fit created between the lobes and the outside surface of the shank of the fastener body.

11. The load indicating fastener according to claim 1 wherein the securing mechanism includes one or more lobes provided on the outside surface of the shank of the fastener body and a localized interference fit created between the lobes and the inner surface defining the through hole of the load indicator.

12. The load indicating fastener according to claim 1 wherein the securing mechanism includes one or more tack welded interconnections formed between the outside surface of the shank of the fastener body and the inner surface defining the through hole of the load indicator.

13. The load indicating fastener according to claim 1 wherein the securing mechanism includes a shaped outside surface of the shank of the fastener body and a correspondingly shaped inner surface defining the through hole of the load indicator, the correspondingly shaped outside and inner surfaces creating an interference fit upon partial rotation of the fastener body relative to the load indicator.

14. The load indicating fastener according to claim 1 wherein the securing mechanism includes an adhesive patch affixed to one or both of (a) the inner surface defining the through hole of the load indicator, and (b) the outside surface of the shank of the fastener body.

15. A joint assembly comprising:
at least one joint member;
a load indicating fastener including:
(a) a load indicator having:
an annular body having an inner surface defining a through hole with an inner diameter, and
a plurality of protuberances integral with the annular body struck and partially sheared from the annular body to project from a first face of the annular body and leave a corresponding plurality of indentations in a second face of the annular body opposite from the first face;
(b) a fastener body comprising:
a first series of threads,
a head defining a contact surface, and
a shank depending from the contact surface at its top and having a free end opposite the top and an outside surface with an outer diameter and a radially extending member with a bottom surface; and
(c) a securing mechanism including the radially extending member and retaining the load indicator on the shank of the fastener body with the protuberances proximate to and in alignment with the contact surface, the protuberances having an uncompressed height such that the distance between the bottom surface of the radially extending member and the second face is greater than the height when the protuberances are in non-compressive contact with the contact surface; and
a secondary fastener including:
a secondary fastener body; and
a secondary series of threads;
wherein the shank or a portion of the secondary fastener body extends through the at least one joint member and the first series of threads rotatably engages the secondary series of threads until the contact surface of the head is spaced a predetermined distance from the first face of the annular body.

16. The joint assembly according to claim 15 wherein the radially extending member includes one or more of: a plurality of spaced apart tabs extending from the free end of the shank; at least one thread in the first series of threads having a crest diameter greater than the inner diameter of the through hole; at least one flare, stake, or form extending from the free end of the shank; a step ring, series of bumps, or knurl disposed on the outside surface of the shank of the fastener body and located between the free end and the top so that a first distance exists between the step ring, series of bumps, or knurl and the free end and a second distance exists between the step ring, series of bumps, or knurl and the top; and one or more lobes provided on the outside surface of the shank.

17. The joint assembly according to claim 15 wherein the securing mechanism includes a key disposed on the outside surface of the shank of the fastener body, releasably engaging a keyhole formed in the load indicator, the key and keyhole having corresponding geometries and the key engaging the inner surface of the through hole to create an interference fit.

18. The joint assembly according to claim 15 wherein the securing mechanism includes a chamfer provided at the free end of the shank of the fastener body and an interference fit created between the inner surface of the through hole of the load indicator and the outside surface of the shank of the fastener body, the inner surface having an inner diameter slightly smaller than the outer diameter of the outside surface.

19. The joint assembly according to claim 15 wherein the securing mechanism includes one or more lobes provided on the inner surface defining the through hole of the load indicator and a localized interference fit created between the lobes and the outside surface of the shank of the fastener body.

20. The joint assembly according to claim 15 wherein the securing mechanism includes one or more tack welded interconnections formed between the outside surface of the shank of the fastener body and the inner surface defining the through hole of the load indicator.

21. The joint assembly according to claim 15 wherein the securing mechanism includes a shaped outside surface of the shank of the fastener body and a correspondingly shaped inner surface defining the through hole of the load indicator, the correspondingly shaped outside and inner surfaces creating an interference fit upon partial rotation of the fastener body relative to the load indicator.

22. The joint assembly according to claim 15 wherein the securing mechanism includes an adhesive patch affixed to one or both of (a) the inner surface defining the through hole of the load indicator, and (b) the outside surface of the shank of the fastener body.

* * * * *